E. A. FARR.
OX-YOKE.

No. 175,060. Patented March 21, 1876.

UNITED STATES PATENT OFFICE.

ELI A. FARR, OF CEDAR SPRINGS, MICHIGAN.

IMPROVEMENT IN OX-YOKES.

Specification forming part of Letters Patent No. 175,060, dated March 21, 1876; application filed September 17, 1875.

*To all whom it may concern:*

Figure 1:
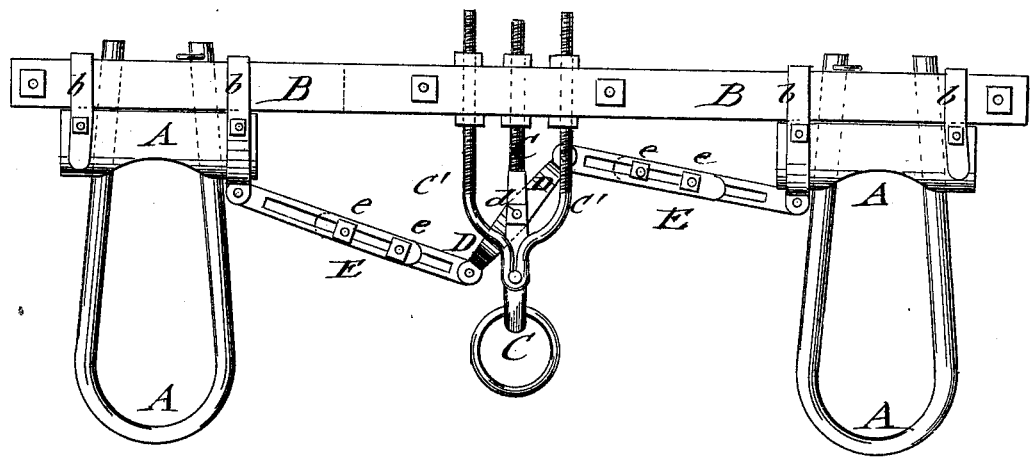
Figure 2:
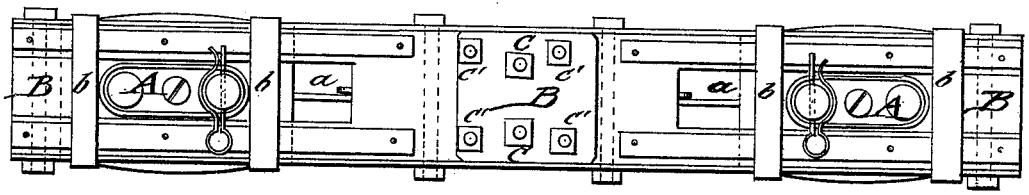

Be it known that I, ELI A. FARR, of Cedar Springs, in the county of Kent and State of Michigan, have invented a new and Improved Neck-Yoke, of which the following is a specification:

In the accompanying drawing, Figure 1 represents a front elevation of my improved neck-yoke; and Fig. 2 a top view of the same.

Similar letters of reference indicate corresponding parts.

The invention will first be described in connection with drawing, and then pointed out in the claim.

In the drawing, A represents the sliding neck-yokes, which move in slotted recesses $a$ of the cross-beam B, being hung thereto by bands $b$. A staple, C, is applied, by threaded ends and screw-nuts, to the center of cross-beam B, and additionally secured by lateral double-brace bolts C' at each side. The brace-bolts C' are, in similar manner as staple C, firmly attached by screw-nuts, and the position of the staple and braces adjusted to greater or less height on the cross-beam as the line of draft is required by the special work to be at greater or less depth. The force of the draft is exerted at the lower end of the staple, which allows, by the adjustability of the staple to the special work, or to the position of the heads of the animals, the utilization of the full power of the draft. A fulcrumed lever, D, made of two symmetrically-curved braces, is centrally fulcrumed to a pivot-bolt, $d$, of the staple, the ends being pivoted to slotted bars or links E, that connect the lever with the sliding neck-yokes A. Each connecting-link E is made of two parts, that are adjusted to greater or less length by clamp-screws $e$, so that the yokes may be allowed to slide to equal or variable length, according to the size of the animals. The sliding and link-connected yokes give free play to the heads of the animals, and overcome thereby the rigidity and other objectionable features of the double yoke, while they secure, at the same time, the full power of the draft, as the staple may be adjusted to the exact condition of the animals and the work to be performed.

Having thus described my invention, I claim as new and desire to secure by Letters Patent—

In double neck-yokes, the combination, with the main beam, of a central draft-staple and brace-rods, being vertically adjustable to greater or less depth on the beam, to regulate height of draft, substantially as and for the purpose set forth.

ELI A. FARR.

Witnesses:
D. C. LYLE,
E. F. CHESTER.